United States Patent [19]

Fanini et al.

[11] Patent Number: 4,758,150

[45] Date of Patent: Jul. 19, 1988

[54] SCOOP FOR DISPENSING BALLS OF ICE CREAM

[76] Inventors: Bruno Fanini, Via Cacciatori Piemontesi 21; Adelio Ciresola, Via Peschiera 4; Alberto Aldegheri, Via Trainotti 6, all of Verona, Italy

[21] Appl. No.: 818,417

[22] Filed: Jan. 13, 1986

[30] Foreign Application Priority Data

Jan. 24, 1985 [IT] Italy .................. 84907 A/85

[51] Int. Cl.⁴ ............................................. A47J 43/20
[52] U.S. Cl. .................................... 425/285; 425/187
[58] Field of Search .............. 425/187, 221, 276, 279, 425/280, 282–286, 458; 249/77

[56] References Cited

U.S. PATENT DOCUMENTS

| | | | |
|---|---|---|---|
| 1,763,389 | 6/1930 | Chapman | 425/280 |
| 2,412,050 | 12/1946 | Lawrence et al. | 425/280 |
| 2,547,651 | 4/1951 | McCrum | 425/280 |
| 2,571,729 | 10/1951 | Lawrence et al. | 425/280 |
| 2,631,551 | 3/1953 | Lawrence et al. | 425/187 |
| 3,598,062 | 8/1971 | Weinstein | 425/284 |
| 3,784,341 | 1/1974 | Magalott et al. | 425/280 |

*Primary Examiner*—Jay H. Woo
*Assistant Examiner*—James C. Housel
*Attorney, Agent, or Firm*—Guido Modiano; Albert Josif

[57] ABSTRACT

This invention relates to a scoop for dispensing balls of ice cream. The scoop comprises a spoon or dish portion equipped with a sweeping band or doctor blade mounted for rotation on the spoon, and a handle. The spoon and its sweeping band are removably engageable with the handle by means of three fixed pins, or through a ring nut which is secured to the spoon and can be fitted on the handle. The pivot pin of the sweeping band is operatively connected to a drive system actuated by an electric motor or a fluid-operated cylinder/piston unit housed in the handle. The electric motor or the fluid-operated unit can be controlled through a push-button and is arranged to impart a rotary motion through approximately 180° first in one direction and then in the opposite direction to the sweeping band.

3 Claims, 2 Drawing Sheets

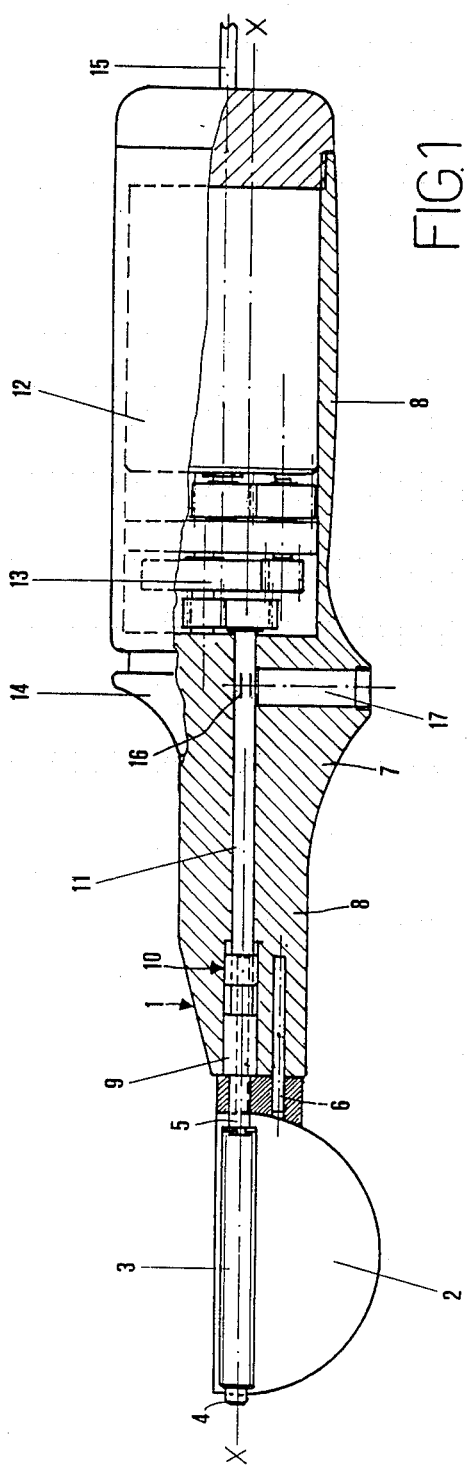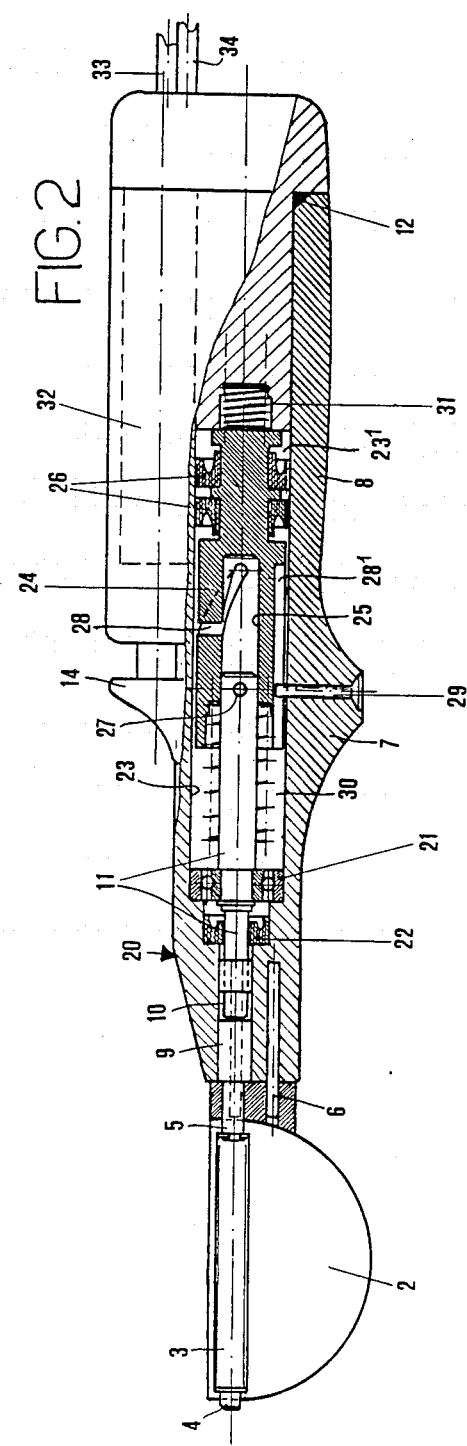

SCOOP FOR DISPENSING BALLS OF ICE CREAM

BACKGROUND OF THE INVENTION

This invention relates to a scoop for dispensing balls of ice cream.

Traditional scoops for dispensing ice cream balls comprise a hemispherical spoon, a respective sweeping band or doctor blade, and a pliers-like spring baised handle cooperating with a rack and pinion arrangement for actuating the sweeping band. Such traditional scoops tend to fatigue the operator when used for long time periods and are of very slow operation.

SUMMARY OF THE INVENTION

It is an object of this invention to provide a distributing scoop for edible ice creams, which can be operated on a semiautomatic, i.e. after its spoon is filled with ice cream paste, the ice cream is caused, on command, to separate automatically from the scoop in the shape of an ice cream ball.

Another object of this invention is to greatly increase, all the other conditions being equal, the number of the ice creams balls an operator can dispense in a time unit.

Another object of this invention is to provide a scoop for dispensing balls of ice cream, which is of practical use, of reliable operation, and of relatively low manufacturing cost.

These and other objects which will become apparent hereinafter are achieved by a scoop for dispensing balls of ice cream, comprising a spoon, a doctor blade or sweeping band pivotally mounted in the spoon, and a handle carrying the spoon with the sweeping band, characterized in that it has a motor housed inside the handle, a drive system for operatively connecting the motor to the sweeping band, and a control means for the motor, thereby each time the control means is actuated, the sweeping band effects a sequential rotary movement first in one direction and then in the opposite direction.

BRIEF DESCRIPTION OF THE DRAWINGS

Further aspects and advantages of this invention will be more clearly understood from the following detailed description of some presently preferred embodiments thereof, with reference to the accompanying drawings, where:

FIG. 1 shows a longitudinal sectional view of an electrically operated scoop;

FIG. 2 shows a longitudinal sectional view of a pneumatically operated scoop;

DESCRIPTION OF THE PREFERRED EMBODIMENTS

Figure 3:
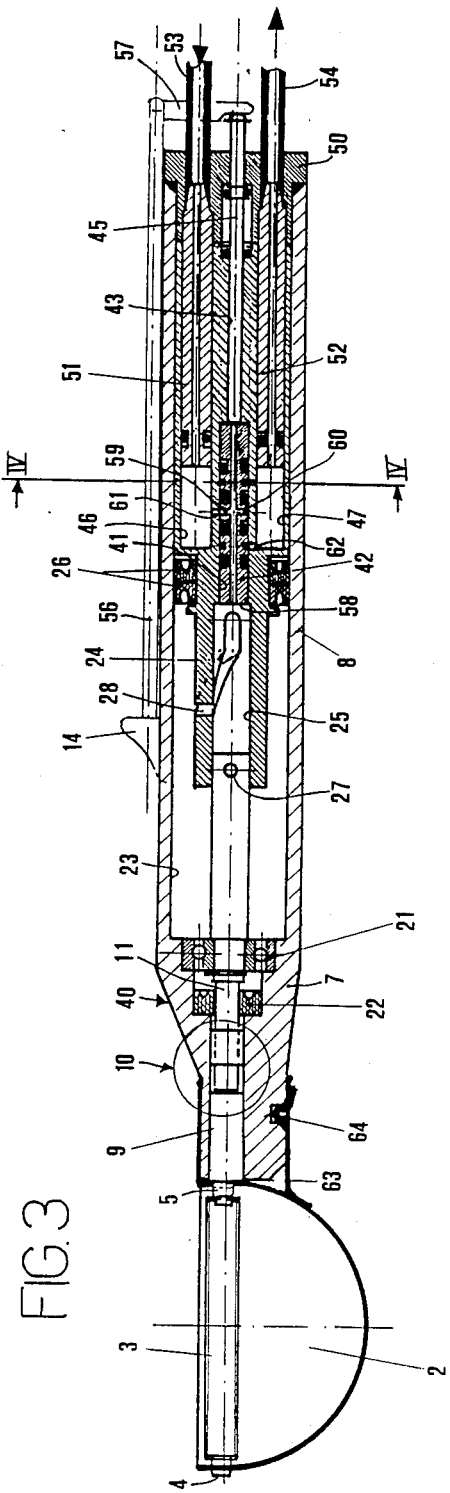
FIG. 3 shows a longitudinal sectional view of another embodiment of a pneumatically operated scoop.

With reference to the embodiment shown in FIG. 1, a scoop 1 comprises an approximately hemispherical spoon or dish 2 in which an arcuate sweeping band or doctor blade 3 is pivotally mounted, through two side juts 4 and 5 so as to be able to turn about a diametrical axis X—X of the spoon (which also coincides with the longitudinal axis of the scoop). Three small pins, one of which is indicated at 5 and the other two (only one of which is visible in the drawings) are indicated at 6, project from the spoon 2. The pins 5 and 6 of the spoon are designed for bayonet coupling with and removal from one end of a holder 7 whose other end is shaped as a handgrip or handle 8.

Figure 5:
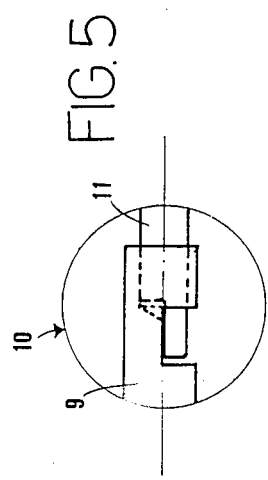
FIG. 5 shows on enlarged scale a detail of FIGS. 1, 2 and 3.

The pin 5 is integral with a secondary shaft 9, which can be rotated through a clutch 10, (see also FIG. 5), by a primary drive shaft 11. The latter is driven by an electric motor 12 housed within the handgrip 8 along with reduction gearing 13.

On the exterior of the handgrip 8 and on its side confronting the spoon 2, there is provided a pushbutton 14 arranged to control an on/off switch (not shown) for the motor 12, whereas at the free end of the handgrip a cable 15 electrically connects the motor 12 to an electric power supply.

Upon energization of the electric motor 12, when depressing the pushbutton 14, the drive shaft 11 is rotated together with the doctor blade or sweeping band 3. The shaft 11 has two control marks, e.g. two reflecting surfaces or notches, generally indicated at 16 which are arranged at a predetermined angular distance from one another and designed to be "read" by a phototransistor or a photodiode 17, i.e. the marks 16 reflect radiation emitted by the phototransistor or photodiode 17 which is connected via suitable set/reset drive circuitry (not shown) to the power supply of the motor 12. Upon detecting reflected radiation the component 17 generates a control signal for the motor 12. When the pushbutton 14 is actuated by operator, power is supplied to the motor 12 which is thus set in rotation together with the shaft 11. Approximately after half a turn one of the marks 16 is struck by radiation from the component 17 and reflects it.

The component 17 thus generates an output signal which causes the motor 12 to stop and reverse its direction of rotation such as by reversing the polarity of the motor 12. Once the shaft 11 has rotated in the reverse direction through 180°, i.e. the blade 3 has reached its starting position, the second mark 16 is read by the component 17 which generates an output signal to cut off power supply to the motor 12 and reset the drive circuitry. This operating cycle is repeated each time the pushbutton 14 is pressed.

A scoop 20 according to the invention shown in FIG. 2 is pneumatically operated. Some of its components which are identical with, or structurally similar to those of the scoop of FIG. 1, are identified by the same reference numerals and further description thereof is deemed unnecessary.

In the scoop 20, the drive shaft 11 is mounted for rotation on a bearing 21 through a seal 22 and extends to a chamber 23 formed in the holder 7. In the chamber 23, a piston 24 is slidably mounted which, on its end facing the shaft 11, has a blind hole 25 for slidably receiving therein the adjacent end of the shaft 11, whereas at its other end it carries seals 26 and delimits a chamber 23'. Thus, the piston 24 can slide on a section of the shaft 11. A small pin 27 laterally projecting from the shaft 11 slidably engages in a throughgoing helical guide or groove 28 formed in the piston wall. A straight groove 28' slidably engages with a fixed guide pin 29 fast with the holder 7, whereby the piston 24 can be displaced but cannot rotate in the chamber 23. At the same time, the helical groove 28 while the piston is being displaced, causes the shaft 11 to turn without being displaced.

Provided on the shaft 11 is a buffer coil spring 30 having one end resting against the piston 24 and its other end against the bearing 21. A buffer spring 31 is also provided behind the piston 24 inside the handgrip 8. Springs 30 and 31 are designed to exert a damping effect on the piston 24 at the end of each stroke.

In this embodiment the pushbutton 14 is arranged to control a distributor which is generally indicated at 32 and housed within the handgrip 8. The distributor 32 is designed to shut off the flow of compressed air through two conduits, i.e. one conduit 33 for the forward stroke of the piston and the other 34 for its return stroke, the said conduits being connected to a source (not shown) of compressed air.

Operation of the distributor 32 by the pushbutton 14 results in compressed air being supplied through suitable conduits (not shown) first to the chamber 23', thereby driving the piston forward and rotating the shaft 11, and hence the shaft 9 and the blade 3, through approximately 180°. Immediately after the conduit 33 is shut off by the distributor 32 and compressed air is supplied to the chamber 23 through conduit 34, whereby the piston is caused to reverse its motion and thus to reverse rotation of shaft 11 and blade 3, to reach its starting position.

Figure 4:
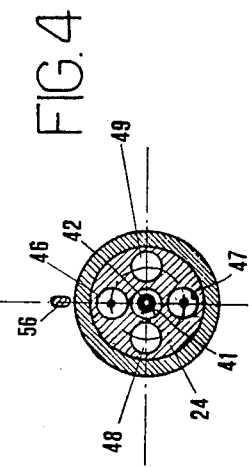
FIG. 4 is a sectional view taken along the line IV—IV of FIG. 3.

A scoop 40 of FIGS. 3 and 4 could be regarded as a modification of the scoop 20 shown in FIG. 2. In the scoop 40 the drive connection between the piston 24 and the shaft 11 comprises a groove 28 slidably engaged by a small pin 27 fast with the shaft 11. However, the piston 24 has a considerable extension on its end opposite that engaged by the shaft 11, and the chamber 23 spans the full length of the handle 8. The piston 24 has inside thereof three axial cavities arranged in succession, namely a cavity 25 for accommodating one end of the shaft 11, and intermediate cavity 41 adapted to slidably accommodate therein a valve element 42 configured as a slide valve distributor, and a hole 43 which has a smaller light than the cavity 41 and in which a small internal rod 45 can sealingly slide to actuate the valve element 42. The piston 24 is also formed with two longitudinal bores 46 and 47 located at diametrically opposite positions with respect to the piston axis. Advantageously, two additional longitudinal bores 48 and 49 (FIG. 4) may be provided which act as thrust bores, as explained below.

The chamber 23 is closed at the handle end by a stopper 50 which carries on its inner face two hollow guide pins 51 and 52 secured to it. The pins 51 and 52 are arranged and sized to slidably and sealingly fit in a respective longitudinal bore 46, 47 in the piston to act as guide elements for the piston.

A supply duct 53 is connected to the stopper 50 and extends from a supply (not shown) of a compressed fluid (air) and communicates with the hollow pin 51 and a return duct 54.

On the handgrip 8 there is also mounted a pushbutton 14 arranged to control a linkage including an outer longitudinal rod 56 pivoted to one end of a small lever 57 which can be fulcrumed on the duct 53 and has its other end abutting against the end of the rod 45 projecting from the stopper 50.

The valve element 42 has an axial cavity 58 in communication with two opposite cross bores 59 and 60 designed to be displaced in alignment with a respective passage, i.e. the bore 59 with a passage 61 for communication between the cavity 41 and the bore 46 in the piston and the bore 60 with a passage 62 for communication between the cavity 41 and the bore 47.

In the condition illustrated in FIG. 3, compressed air is supplied through duct 53 and hollow pin 51 into the bore 46 of the piston. Thus, air can enter the valve element 42 through the passage 61 now in alignment with bore 59, and flows through the bore 25 in the piston into the chamber 23, thereby holding the piston 24 urged against the stopper 50.

Upon pressing the pushbutton 14 rearwards, the valve element 42 is displaced until bore 60 is brought into alignment with the passage 62 to exhaust the pressurized air from the chamber 23 through the bore 47, the hollow pin 52 and the return line 54. At the same time, air under pressure in the bore 46 and possibly in the thrust bores 48 and 49 in communication therewith, moves the piston which slides along the shaft 11 and is caused to rotate until it abuts against the valve element 42 and is displaced by it back to its starting position (that shown in FIG. 3). In so doing the pushbutton 14 and its respective control linkage is also set back to its home position ready for starting a new operating cycle. It will be appreciated that in this embodiment, no buffer or piston return springs are provided. In addition, the spoon 2 can be attached to the holder 7 by means of a ring nut 63 arranged to be fitted on the end of the holder 7 and to be snap-locked at 64.

The invention described above is susceptible to many modifications and variations without departing from its scope as defined by the appended claims.

Thus, the fluid-operated unit can comprise in general either a double- or single-acting cylinder/piston unit.

Furthermore, the scoop handle can have an angled set (e.g. by about 5° to 15°) with respect to the pivot axis of the sweeping band 3.

It will be noted that the invention achieves all of the objects set forth in above, and in particular it can considerably alleviate the operator's effort while making it possible faster dispensing of ice cream balls.

Moreover, the bayonet coupling between the spoon and the holder allows rapid replacement of one spoon with one of different capacity for use on one and the same power-driven holder 7.

The materials and dimensions may vary according to requirements.

What is claimed is:

1. A scoop for dispensing balls of ice cream having a spoon, a sweeping band pivotally mounted in the spoon, a handle carrying the spoon with the sweeping band, and an electric motor and a speed reduction gearing housed inside the handle, a drive system including a drive shaft for operatively connecting the electric motor to the sweeping band, and control means comprising in combination a pushbutton mounted on the handle for the electric motor, a drive circuitry connecting a phototransistor or photodiode to the electric motor, and a pair of reference marks provided on said drive shaft rotated by the electric motor, said reference marks being angularly spaced about a circumferential surface of said shaft and arranged to be detected in sequence by the phototransistor or photodiode, thereby the drive circuitry controls the electric motor and thus the sweeping band, to effect a partial rotation of said sweeping band first in one direction and then in the opposite direction.

2. A scoop for dispensing balls of ice cream comprising a spoon, a sweeping band pivotally mounted in the spoon, a handle carrying the spoon with the sweeping band, a fluid-operated motor having a pressurized fluid duct and a fluid operated cylinder-piston unit connected thereto, a drive system for operatively connecting the piston of the fluid-operated unit to the sweeping band, first guide means for longitudinal displacement of the piston in the cylinder, second guide means disposed between the piston and the said drive system and including a helical groove-detent engagement means for converting to longitudinal displacement of said piston into rotational movement of said drive system and a slide valve distributor in the fluid-operated unit for changing the direction of rotation of said piston, whereby each stroke of the piston in the cylinder causes the drive system, and thus the said sweeping band, sequentially to effect a partial rotation first in one direction and then in the opposite direction.

3. A scoop according to claim 2, wherein the said cylinder of said fluid-operated unit is housed in said handle and the said drive system has a secondary shaft arranged to drive the sweeping band and a primary shaft having one end slidably and rotatably located in the piston of the fluid operated unit.

* * * * *